United States Patent
Meurer

(10) Patent No.: US 6,245,243 B1
(45) Date of Patent: Jun. 12, 2001

(54) SETTLER PLATE SUPPORTS WITH INTEGRAL OUTLETS FOR INDIVIDUAL FLOW CHANNELS AND METHODS OF COLLECTING LIQUID FROM EACH FLOW CHANNEL

(75) Inventor: Charles Lonnie Meurer, Golden, CO (US)

(73) Assignee: Meurer Industries, Inc., Golden, CO (US)

( * ) Notice: Subject to any disclaimer, the term of this patent is extended or adjusted under 35 U.S.C. 154(b) by 0 days.

(21) Appl. No.: 09/413,684

(22) Filed: Oct. 7, 1999

(51) Int. Cl.⁷ .................................................. B01D 21/24
(52) U.S. Cl. .................. 210/802; 210/521; 210/522; 210/540
(58) Field of Search .................................. 210/800, 802, 210/521, 522, 538, 540

(56) References Cited

U.S. PATENT DOCUMENTS

| | | | |
|---|---|---|---|
| 748,981 * | 1/1904 | Oliver | 210/540 |
| 1,543,621 * | 6/1925 | Ruckstuhl | 210/522 |
| 1,557,340 * | 10/1925 | Sandmann | 210/522 |
| 2,242,139 * | 5/1941 | Monroe | 210/540 |
| 2,302,450 | 11/1942 | Laughlin | 210/130 |
| 2,314,977 * | 3/1943 | Green | 210/522 |
| 3,447,688 * | 6/1969 | MacCabe | 210/540 |
| 3,613,889 | 10/1971 | Reed | 210/84 |
| 3,886,064 * | 5/1975 | Kosonen | 210/522 |
| 3,903,000 | 9/1975 | Miura et al. | 210/251 |
| 3,925,205 | 12/1975 | Sparham | 210/73 |
| 3,963,624 | 6/1976 | Henderson et al. | 210/521 |
| 4,136,012 | 1/1979 | Louboutin et al. | 210/208 |
| 4,221,671 | 9/1980 | Meurer | 210/522 |
| 4,246,102 | 1/1981 | Hjelmner et al. | 210/704 |
| 4,346,005 | 8/1982 | Zimmerman | 210/232 |
| 4,514,303 * | 4/1985 | Moore | 210/521 |
| 4,865,753 | 9/1989 | Meurer | 210/802 |
| 4,889,624 | 12/1989 | Soriente et al. | 210/232 |
| 4,988,441 * | 1/1991 | Moir | 210/522 |
| 5,116,443 | 5/1992 | Meurer | 156/209 |
| 5,132,010 * | 7/1992 | Ossenhop | 210/522 |
| 5,143,625 * | 9/1992 | Ballard | 210/802 |
| 5,217,614 | 6/1993 | Meurer | 210/521 |
| 5,366,638 * | 11/1994 | Moore | 210/521 |
| 5,378,378 | 1/1995 | Meurer | 210/788 |
| 5,391,306 | 2/1995 | Meurer | 210/802 |
| 5,552,050 * | 9/1996 | Valentin | 210/540 |

* cited by examiner

Primary Examiner—Christopher Upton
(74) Attorney, Agent, or Firm—C. E. Martine, Jr.

(57) ABSTRACT

Improved settlement of solids is provided, while minimizing problems in collecting clarified liquid from a clarifier, by controlling the flow of clarified liquid from a given one of many flow channels of a clarifier. Such control is by causing a substantial amount of that flow of clarified liquid to be collected immediately as that flow exits the given flow channel. Such collection of the substantial amount, if not all of that flow of the clarified liquid from the given flow channel, minimizes if not eliminates, the mixing of the flow from all of the flow channels of a clairfier. As a result, during normal settling operations the flow of the clarified liquid from the given flow channel is substantially isolated. During such normal operations, the isolated flow may be separately sampled for examination of the performance of the separate flow channel. If too many solids are present in the clarified liquid from that separate flow channel then one or both of the plates that define that separate flow channel may be removed and replaced. Servicing operations of removal and replacement of the one or both plates are performed without interrupting the normal settling operations of the other flow channels.

32 Claims, 14 Drawing Sheets

SETTLER PLATE SUPPORTS WITH INTEGRAL OUTLETS FOR INDIVIDUAL FLOW CHANNELS AND METHODS OF COLLECTING LIQUID FROM EACH FLOW CHANNEL

BACKGROUND OF THE INVENTION

1. Field of the Invention

This invention relates to apparatus and methods for promoting settling of solids from waste water, and more particularly to supports for settler plates, wherein each support is provided with an integral outlet for clarified liquid flowing from an individual flow channel defined by adjacent settler plates.

2. Discussion of the Prior Art

Clarifiers (also known as "settlers") are used to remove certain materials and particles from liquid. These materials are generally suspended in the liquid and can be removed under the force of gravity when the flow of the liquid is substantially reduced, as in a very low flow, or quiescent, zone (or flow channel) in the clarifier. Since these materials are generally solid and are said to "settle" out of the liquid, they are referred to as "settleable solids". Such settleable solids may include naturally occurring materials (e.g., clay, silts, sand and dirt), chemical precipitants and biological solids. The word "solids" as used herein to describe the present invention refers to such settleable solids.

Clarifiers are used, for example, in water and waste water treatment plants. In water treatment, the water drawn from a water supply has various non-settleable colloidal solids therein. When mixed with chemicals, the colloidal solids and chemicals agglomerate to form solids. In waste water treatment, the solids include organic solids, among other wastes. Water and waste water are treated in clarifiers to remove such solids, thereby making the water clear and suitable for use, reuse, or for further treatment, such as tertiary treatment. The word "liquid" as used herein to describe the present invention refers to water and waste water.

An object of water and waste water clarifiers is to create quiescent zones having low flow rates to promote maximum settlement of solids to the bottom of the clarifiers. Clarifiers typically include a large detention basin where the settlement of the solids occurs. Tubes or flat plates mounted at fixed angles relative to the surface of the liquid have been used to form multiple thin liquid flow channels. For example, a support which may be in the form of a hollow pipe is connected to the top of one of the plates. Adjacent supports mount a pair of adjacent ones of such plates so that the adjacent plates define such a flow channel and create a quiescent zone within the detention basin in an attempt to promote settling of solids in less time using less space. The liquid containing the solids flows upwardly in the flow channels between the plates at flow rates that generally allow sufficient time for most of the solids to settle onto the plates or tubes. The hollow pipes are closed to the liquid and solids in the flow channels. Ideally, the solids then slide down the plates to the bottom of the detention basin for collection. After the solids have settled, the liquid without the settled solids is referred to as the "clarified liquid". The clarified liquid flows upwardly past the adjacent hollow pipes and out of an open top of the flow channel defined by adjacent ones of the pipes. Such open top is between and at the top of the plates. Generally, the clarified liquid from each of the separate flow channels combines to form one or more common volumes of clarified liquid above the tops of the plates and above the hollow pipes. Thus, the clarified liquid from the separate flow channels commingles and mixes in the common volume(s). The common volume(s) of clarified liquid generally flows to an outlet at an end of the retention basin and exits the basin.

As an example, in U.S. Pat. No. 5,116,443 (issued in the name of Applicant), a hollow pipe having a rectangular cross-section is shown carrying rods that support the plates. Clarified liquid from between pairs of the plates flows together (i.e., commingles and mixes as described above) and exits the end of the basin via a trough. Because the hollow pipes are closed to the liquid and solids in the flow channels, the clarified liquid does not enter the pipes. Instead, the clarified liquid flows past and above the pipes into the and then flows to the trough.

As another example, in U.S. Pat. No. 4,865,753 (issued in the name of Applicant), a flap members is provided at the top of each flow channel and releasably closes the flow channel. As the flap releases, the clarified liquid from each flow channel flows past and above the respective flap, flows together, and then exits the basin via a trough.

In yet another example, in U.S. Pat. No. 5,378,378 (issued in the name of Applicant), clarified liquid from each of many flow channels flows out of the top of a clarifier section, flows together, and then exits the basin via an outlet.

As a further example, in U.S. Pat. Nos. 4,221,671 and 5,217,614 (issued in the name of Applicant), clarified liquid from each of many tubular flow channels flows out of the top of each of the tubes, then flows together, and then exits the basin via a trough. In the '671 Patent, a perforated plate is placed over and spaced from the top of the tubes to define an overflow lauder.

As another example, in U.S. Pat. No. 5,391,306 (issued in the name of Applicant), a member is attached to the top of each of many clarifier plates to support the respective plate. Members supporting adjacent ones of the plates also control the flow of the clarified liquid from the flow channel defined by the adjacent plates. Although the members are shown as being hollow, the hollow members are closed to the liquid and solids. Therefore, the clarified liquid does not enter the members. Instead, the clarified liquid from one flow channel flows past and above the members of that flow channel, and joins clarified liquid flowing out of the other flow channels, and then the clarified liquid from all of the flow channels flows to an outlet of the basin.

An additional example is found in U.S. Pat. No. 4,136,012, wherein two clarifier outlet pipes are provided in a clarifier basin for use with over seventy tubes. Each tube defines one flow channel, such that over seventy flow channels are served by the two outlet pipes. The outlet pipes are above the tops of tubes (and thus above the tops of the clarifier flow channels) and do not support the tubes that define the flow channels. As a result, it appears that most, if not all, of the clarified liquid flowing from each tube joins together in a common volume, rises and flows into apertures formed in one or both of the two outlet pipes for flow to an outlet of the basin.

U.S. Pat. No. 4,889,624 shows a frame containing about twelve lamella plates that define separate flow channels of a clarifier. Each flow channel is defined by adjacent ones of the lammella plates. Tops of the plates are provided with legs that tend to close the upper end of each of the flow channels. To allow the clarified liquid to flow out of the flow channel, orifices are provided in the legs. The clarified liquid flowing out of one flow channel flows through the orifices of that channel, rises and and joins clarified liquid flowing out of the other flow channels. Then the clarified liquid from all of the flow channels flows over the edge of the frame to an outlet trough of the basin. It appears that a pressure drop exists across the legs, with a higher pressure being below the legs than the pressure above the legs. As a result, the higher pressure below the legs tends to lift the legs and must be counteracted by asdditional structure, such as bolts, to hold the plates down.

As a settling element in addition to adjacent plates, U.S. Pat. No. 3,963,624 shows multiple troughs adjacent to the tops of some but not all of many of the plates in a basin. As clarified liquid flows horizontally over the troughs, the troughs block any vertical flow of the liquid. With the vertical flow blocked, any entrained solids will drop out into the troughs so that the once-clarified liquid is further clarified as it flows toward a weir for exiting from the basin.

In these clarifiers, when clarified liquid exits the upper end of one particular flow channel, the clarified liquid from one flow channel generally joins with the clarified liquid from most, if not all of, the other channels. In most cases, there are at least tens of separate flow channels, such that the flow from tens of flow channels joins together and flows to an outlet trough, for example.

In the operation of many types of clarifiers, plates may become fouled when solids accumulate on the plates, for example. In such situations, it is necessary to remove the fouled clarifier plate. With the one plated removed, the two plates adjacent to the fouled plate cooperate to define a now-wider one of the flow channels. Problems result when a prior art plate of the type shown in U.S. Pat. No. 4,889,624 is removed. For example, without the removed plate and the legs at the top end of the removed plate, there is no leg to restrict the flow of the clarified liquid out of the top of the original flow channel. As a result, it is likely that there will be an increased flow rate of liquid and solids in the now-wider channel between the two remaining adjacent plates, less settling in that now-wider channel, less clarified liquid for a given inflow of solids, and thus more solids flowing out of the now-wider channel. The increased flow rate tends to disturb the flow rates in the other channels, such that the operation of the clarifier may have to be interrupted during repair of the plate.

In other types of clarifiers without such legs at the top of the flow channels, there would be the same flow rate of liquid and solids in the now-wider channel between the two remaining adjacent plates. However, because of the removal of the middle plate, the vertical settling distance between the two remaining settler plates is now twice the former vertical settling distance. Therefore, because the flow of the liquid in the now-wider flow channel is the same as before removal of the middle plate, less of the solids will move vertically downward onto the lower of the two remaining plates, and therefore less of the solids will settle. To avoid allowing the less clarified liquid from the now-wider flow channel to flow to the trough, the operation of the clarifier may have to be interrupted during repair of the removed plate.

Also, in many clarifiers, the support for a particular plate tends to block the upward flow of the clarified liquid. Such blockage results, for example, from the need to increase the size of the support to increase the strength of the support and prevent sagging of the support as it extends across the clarifier basin. Even when the sagging problem is overcome with a minimum of such blockage, the prior supports, the clarified liquid from different flow channels still combines in the space above the flow channels.

Therefore, what is needed is a separate support for each settler plate, wherein each separate support reduces the blockage of clarified liquid from a flow channel and not only carries the one settler plate, but is also provided with an integral inlet for receiving clarified liquid flowing from flow channels adjacent to the separate support, and preferably, for receiving clarified liquid primarily from one individual flow channel defined in-part by the settler plate carried by the one separate support.

SUMMARY OF THE INVENTION

Applicant has studied prior clarifiers in an endeavor to improve the settlement of solids while minimizing the problems described above, and to overcome these long-felt problems by controlling the flow of clarified liquid from a given one of many flow channels of a clarifier. Such control may be by causing a substantial amount of that flow of clarified liquid to be collected immediately as that flow of the clarified liquid exits the given flow channel. Such collection of the substantial amount, if not all of that flow of the clarified liquid from the given flow channel, minimizes if not eliminates, the mixing of the flow from all of the flow channels of a clairfier. As a result, during normal settling operations the flow of the clarified liquid from the given flow channel is substantially isolated. During such normal operations, the isolated flow may, for example, be separately sampled for examination of the performance of the separate flow channel. If it is found that too many solids are present in the clarified liquid from that separate flow channel, for example, then one or both of the plates that define that separate flow channel may be removed and replaced.

Further, the servicing operations of removal and replacement of the one or both plates may be performed without interrupting or substantially impairing the normal settling operations of the other flow channels. In particular, even though there is a tendency for the same flow rate of liquid and solids to occur in the now-wider channel between the two remaining adjacent plates, the flow through that now-wider flow channel into the trough may be blocked during the servicing operation. With the flow to the trough blocked from the now-wider flow channel, in the present invention the only flow is from the open top of the now-wider flow channel into a separate support (e.g., pipe or trough) for each of the remaining settler plates. That flow into the separate supports is via integral inlets (or apertures) provided in each of the separate supports. The integral inlets permit receipt of the clarified liquid flowing from the now-wider flow channel. However, because the integral inlets are designed to receive the flow only from the original adjacent narrower flow channels, the flow from the now-wider flow channel is restricted, such that the flow into and in the now-wider flow channel is reduced. With the reduced flow rate in the flow channel there is an increase of the residency time of the liquid and solids in the now-wider flow channel. For example, if the now-wider flow channel is twice as wide and the flow rate is half as much, there will be a return to the original settling rate of the former narrow flow channel. As a result, there is an increase in the likelihood of being able to continue normal settling operation of the clarifier during the removal of the fouled settler plate.

One embodiment of the present method of removing the clarified liquid from the basin may utilize hollow support pipes that normally extend across the basin from a first trough mounted opposite to a second trough. Opposite ends of the hollow support pipes are supported on the opposite troughs. A settler plate is hung from each hollow support pipe in a standard manner. Two adjacent support pipes and the corresponding settler plates hung from the respective pipes define one flow channel. A central support pipe, two support pipes (one on each side of the central support pipes), the corresponding settler plates define two adjacent flow channels. This embodiment does not permit the clarified liquid from one of flow channels to join a common volume or flowpath of clarified liquid flowing out of other flow channels of the clarifier. Instead, in this embodiment many of the integral inlets are provided in the upper side of each hollow support pipe, and facing a given one of the flow channels adjacent to the central support pipe. In this embodiment, the level of the clarified liquid extends to but not over the top of the hollow support pipes. This level of the clarified liquid preferably extends over these integral inlets facing the one flow channel. With these integral inlets and the described level of the liquid, substantially all, if not all, of the clarified liquid flowing out of the given one of the flow channels flows through the integral inlets of one of the two hollow support pipes (i.e., of the central support pipe having the inlets that face the given one of the flow channels. That clarified liquid flowing out of the given one of the flow channels is collected in that one central hollow support pipe. The collected clarified liquid flows along that one central hollow support pipe, through a trough inlet, and is discharged from the trough inlet into the trough for flow out of the basin.

A second embodiment of the present method of removing the clarified liquid from the basin may utilize the same hollow support pipes that normally extend across the basin from the first trough mounted opposite to the second trough. In the second embodiment, the level of the clarified liquid extends to and over the top of the hollow support pipes, thus extends over the integral inlets of the one central support pipe. With these integral inlets and the described higher level of the liquid, a primary amount of the clarified liquid flowing out of the given one of the flow channels flows through the integral inlets of the central hollow support pipe (i.e., through the inlets that face that given one of the flow channels. The primary amount is not less than half of the amount of the clarified liquid flowing out of the one flow channel. That primary amount is collected in that one central hollow support pipe. The remainder of the the clarified liquid flowing out of the one flow channel is referred to as a secondary amount and flows through the inlets of the two hollow support pipes that are adjacent to the central support pipe. In each case, the collected clarified liquid flows along the respective hollow support pipe, through a trough inlet associated with the respective pipe, and is discharged from the trough inlet into the trough for flow out of the basin.

In contrast to prior art clarifiers that are designed to allow the clarified liquid from all of the flow channels to mix and flow above the flow channels to a common outlet trough at one end of the basin, for example, the present invention contemplates providing a pipe or other hollow member for both supporting an individual clarifier plate and collecting the clarified liquid from a flow channel that is adjacent to the pipe and to the supported individual clarifier plate.

The present invention also contemplates providing methods of and apparatus for clarifying liquid, wherein the upward flow of clarified liquid in one clarifier flow channel is primarily collected in one of the pipes that is used to support the spaced plates that define the flow channel, and the remainder of that upward flow of clarified liquid in the one clarifier flow channel is secondarily collected in other ones of the pipes that are adjacent to the one pipe.

The present invention further contemplates servicing operations including removal and replacement of the one or both plates without interrupting or substantially impairing normal settling operations of the other flow channels. The flow through a now-wider flow channel into the trough may be blocked during the servicing operation by plugging up a trough inlet that is normally connected to a support pipe that carries the pipe that is to be removed for service. The removal forms a now-wider flow channel. With the flow to the trough blocked from the now-wider flow channel, in the present invention the only flow is from the open top of the now-wider flow channel into a separate support (e.g., pipe or trough) for each of the remaining settler plates. That flow into the separate supports is via integral inlets (or apertures) provided in each of the separate supports. The integral inlets permit receipt of the clarified liquid flowing from the now-wider flow channel. As described above, there is an increase in the likelihood of being able to continue normal settling operation of the clarifier during the removal of the fouled settler plate.

BRIEF DESCRIPTION OF THE DRAWINGS

Other objects, features and advantages of the present invention will be apparent from an examination of the following detailed descriptions, which include the attached drawings in which.

DETAILED DESCRIPTION OF THE PREFERRED EMBODIMENTS

An invention is described for promoting settling of solids from waste water, and more particularly to providing supports for settler plates. The invention is described in terms of each support being provided with an integral outlet for clarified liquid flowing from an individual flow channel defined by adjacent settler plates. It will be obvious to one skilled in the art, that the present invention may be practiced without some or all of these specific details. In other instances well-known process operations or apparatus have not been described in detail in order not to obscure the present invention.

Clarifier 25

Figure 1:
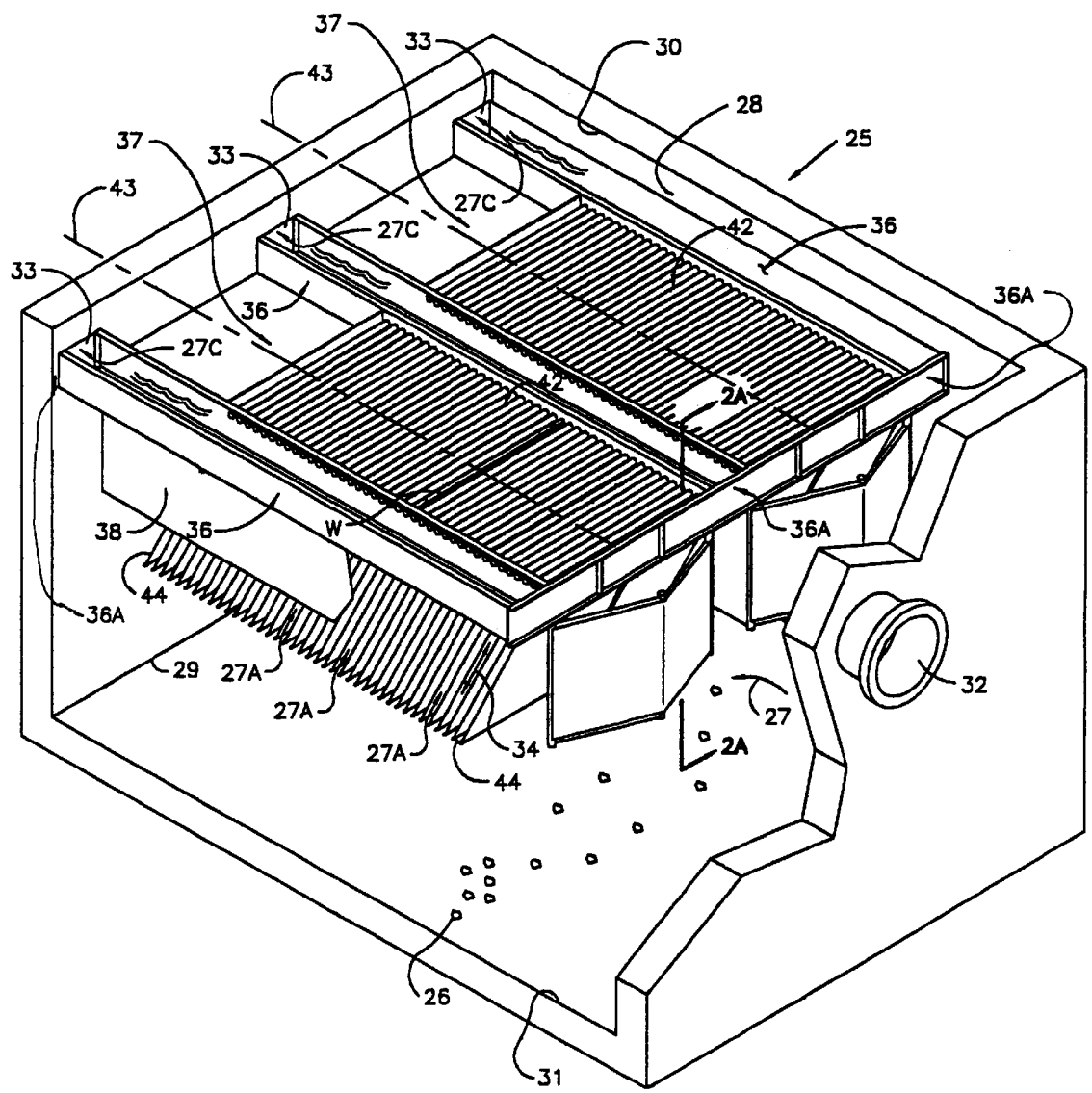
FIG. 1 is a perspective view of a clarifier basin showing hollow supports for clarifier plates.

Referring to FIG. 1, a clarifier 25 is shown for removing materials such as solids 26 from liquid 27. The clarifier 25 is shown including vertical outer walls 28 which define a detention basin 29 having an open top 30 and a bottom 31. One embodiment of the clarifier 25 is shown in FIG. 1 and is referred to as a rectangular clarifier 25A. The clarifier 25 may have other shapes, such as square or circular, and be used with the present invention. References to the clarifier 25 apply to all embodiments of the clarifier.

As the liquid 27 and the solids 26 flow through the detention basin 29 from an inlet 32 to outlets 33, the flow of the liquid 27 and the solids 26 is substantially reduced according to the principles of the present invention to form many very low flow rate, or quiescent, zones or flow channels 34 in the clarifier 25. The liquid 27 and the solids 26 flow upwardly (see liquid/solids flow arrows 27A) in the quiescent zones 34 so that the solids 26 settle out of the liquid 27 and the resulting clarified liquid (represented by arrows 27C), flows to the outlets 33 of the clarifier 25. These outlets 33 may be in the form of openings from troughs 36.

The detention basin 29 is divided into a number of sections 37. Vertical internal partitions 38 define the center sections 37. One partition 38 and one wall 28 define the outer sections 37. One of the troughs 36 is preferably provided at the lateral side 36A of each of the sections 37. However, only one trough 36 may be provided for each section 37, for example.

The liquid 27 and the solids 26 flow upwardly in the quiescent zones 34. After the solids 26 settle out of the liquid 27, the resulting clarified liquid 27C flows to hollow supports 42 spaced along a longitudinal axis 43 of the basin 29. Each of the hollow supports 42 carries one settler plate 44. The settler plates 44 may be of any type, such as those described in Applicant's U.S. Pat. No. 5,391,306 issued Feb. 21, 1995 for Settler With Preset Outlet Area Deck and Variable Angle Removable Lamina and Method of Using Settler, the disclosure of which is incorporated herein by this reference. Adjacent ones of the hollow supports 42 carry respective adjacent ones of the the settler plates 44. The adjacent settler plates 44 define one of the quiescent zones 34. Opposite ends of each hollow support 42 are mounted on one of the troughs 36. This mounting may be removable as described below. The described clarifier section 37 serves the function of containing the liquid 27 and the solids 26. The described plates 44 serve the function of flow control extending across the clarifier section 3, the flow control being performed by the plurality of separate flow control plates 44. The described troughs 36 serve the function of mounting the plurality of flow control plates 44 in spaced relationship to each other for defining the separate clarifier channels 34 in which the liquid 27 flows to settle the solids 26 and provide the clarified liquid 27C.

Flow of Clarified Liquid 27C

Figure 2A:
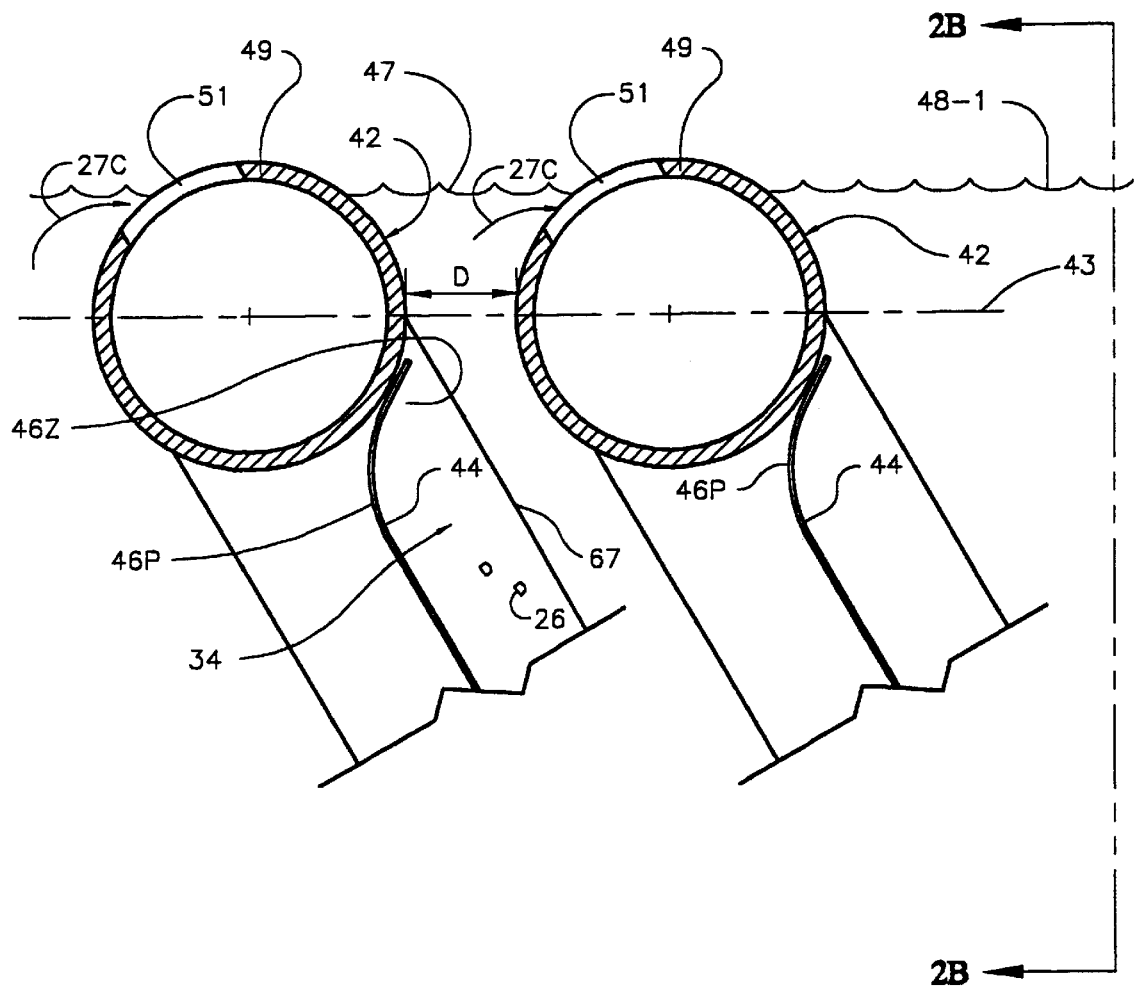
FIG. 2A is an elevational view taken along line 2A—2A in FIG. 1 showing the hollow supports having inlets for receiving clarified liquid.
Figure 2B:
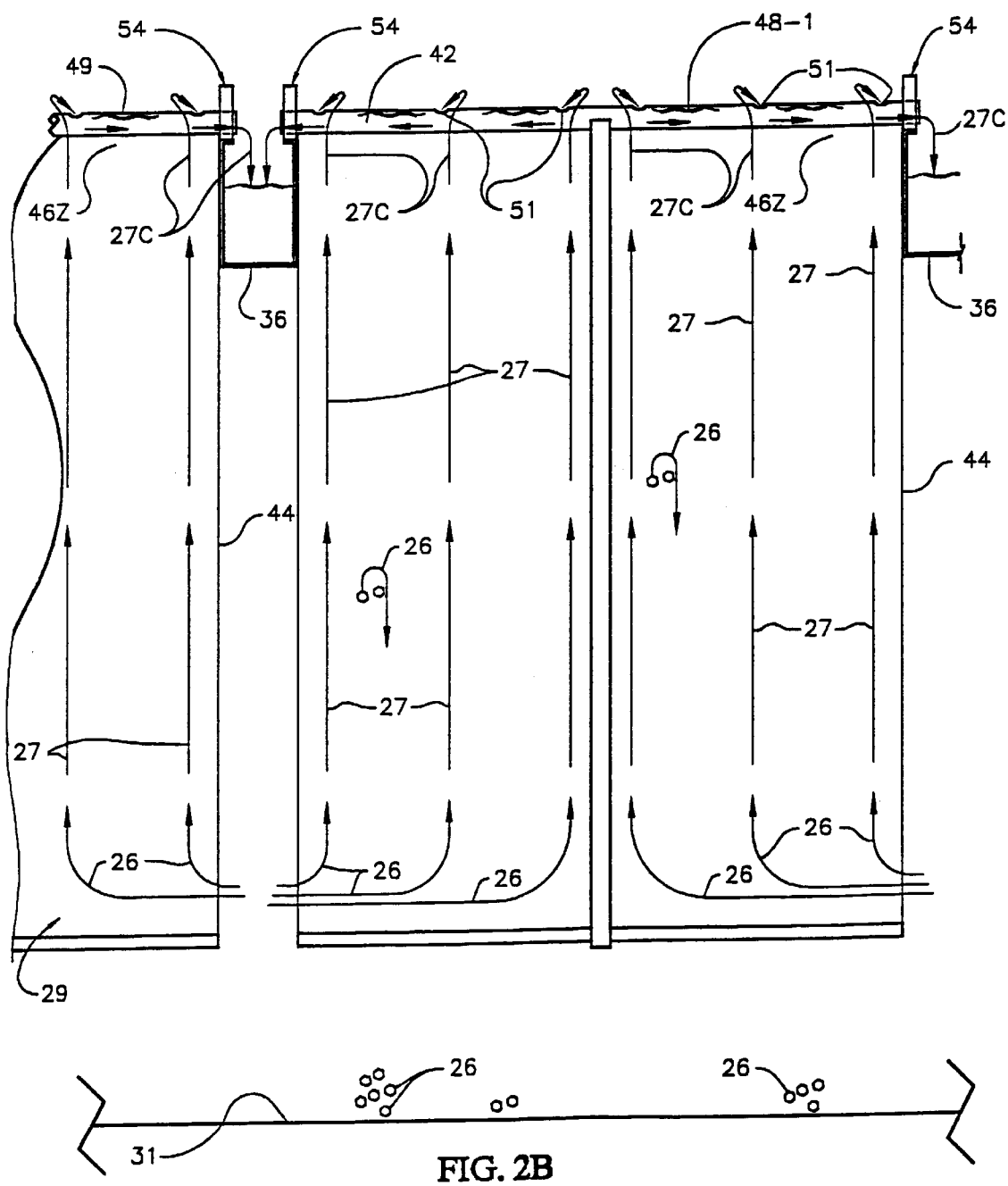
FIG. 2B is an enlarged elevational view taken along line 2B—2B in FIG. 2A showing the flow of liquid and solids from the bottom of the basin upwardly in the flow channels and into the hollow supports for flow in the hollow supports to the respective inlets and then to the outlet trough.

FIG. 2A is an elevational view showing the two adjacent hollow supports 42 spaced along the longitudinal axis 43 of the basin 29. Each of the adjacent hollow supports 42 is shown carrying one of the settler plates 44. The plates 44 are shown as being adjacent to each other and together defining one of the quiescent zones 34 between the adjacent plates 44. FIG. 2B shows an elevational view of the face of two of the plates 44 and the corresponding hollow supports 42 which are mounted on the opposite troughs 36. The solids 26 and the liquid 27 flow upwardly from near the bottom 31 of the basin 29 and into the flow channels 34. As described above, during the upward flow in the zone 34, the solids 26 settle to the bottom 31 and the clarified liquid 27C flows to an upper end 46Z of the zone 34, which end 46Z corresponds to the upper ends 46P (FIG. 2A) of the respective plates 44. The clarified liquid 27C flows past the upper ends 46P and 46Z and through an elongated outlet 47 shown in FIG. 2A extending between the two adjacent hollow supports 42.

The clarified liquid 27C assumes a level 48 in the basin 29 that may vary according to which of a plurality of embodiments of the present invention is being described. For example, FIGS. 2A, 2B, 5C show the level 48 as a level 48-1 of a first most preferable level embodiment. The level 48-1 of the clarified liquid 27C is somewhat below a top 49 of the respective hollow support 42, such as in a range from about 0.25 inches to about 0.125 inches below the top 49. With the level 48-1 in that range, the clarified liquid 27C between the adjacent plates 44 most preferably does not completely submerge the hollow supports 42. In this manner, the clarified liquid 27C does not flow over either or both of the hollow supports 42. Rather, all of the clarified liquid 27C flows upwardly from one of the flow channels (or zones) 34, flows through the outlet 47, and flows into an aperture or opening 51 in the hollow support 42. Since the first level embodiment has the level 48-1 lower than the top 49 of the hollow support 42, the clarified liquid 27C directly and completely flows into and through the opening 51. Thus, in this embodiment normally none of the clarified liquid 27C from the outlet 47 flows completely over either or both of the hollow supports 42, such that there is no commingling of clarified liquid 27C from one flow channel 34 with clarified liquid 27C from another one of the flow channels 34.

Figure 3:
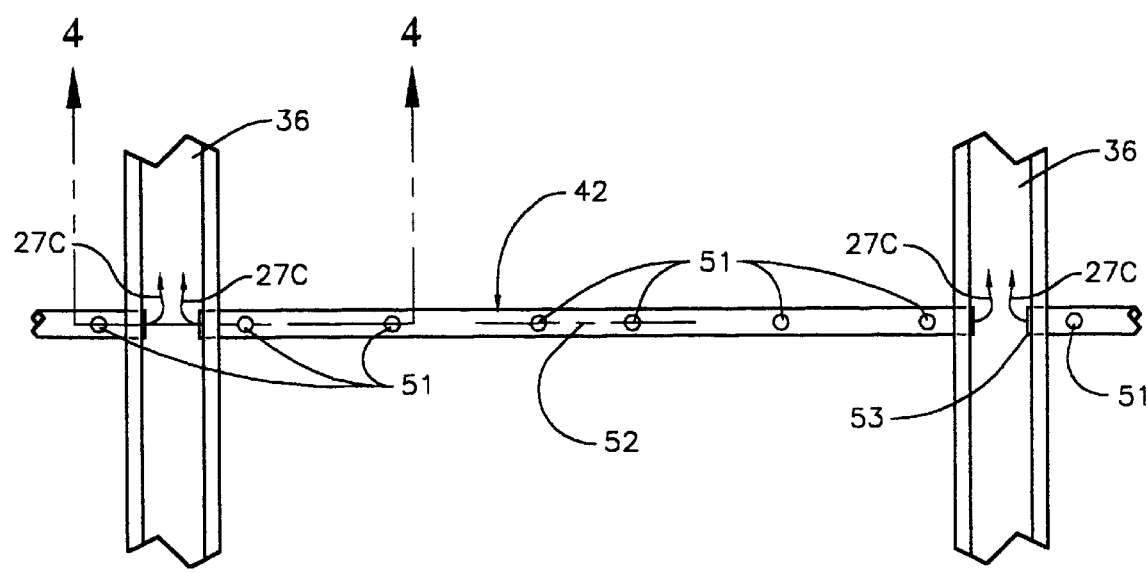
FIG. 3 is a plan view of a clarifier section showing the inlets in the hollow supports spaced along a longitudinal axis.

FIG. 3 shows the inlets 51 in the hollow supports 42 spaced along a longitudinal axis 52 of the hollow supports 42. The spacing of the inlets 51 along the axis 52 is selected according to the anticipated range of flow rates of the liquid 27 and the solids 26 into the basin 29. In this manner, with such flow rate into the basin 29 and with a particular embodiment of the levels 48 of the present invention, the desired flow rate of clarified liquid 27C through the inlets 51 is obtained. For example, flow rates into the basin 29 of about 6 gallons per minute (GPM) to about 9 GPM are common; and flow rates of about from one GPM to 1.5 GPM into the inlets 51 may be expected. As described above for the first level embodiment, for example, with the level 48-1 all of the clarified liquid 27C flows (arrow 27C) from the outlet 47 through the openings 51.

Outlet Troughs 36

Figure 4:
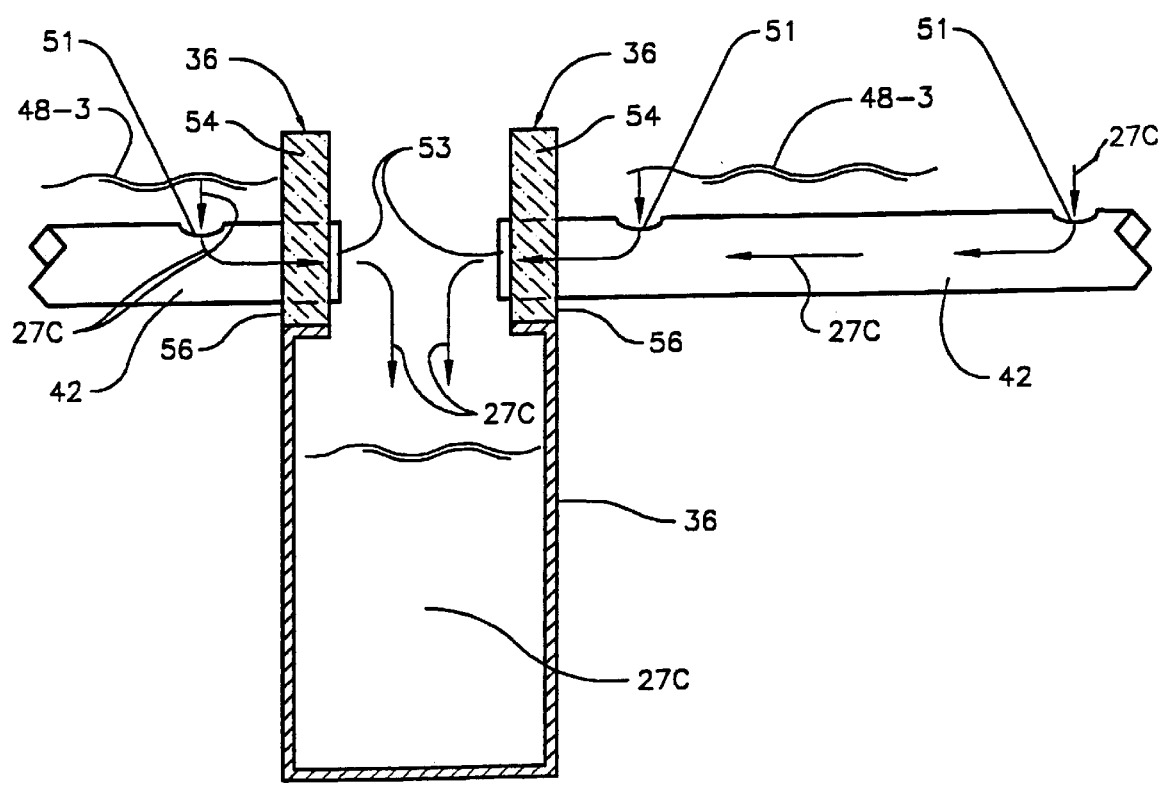
FIG. 4 is an elevational view taken along line 4—4 in FIG. 3 showing the hollow supports connected to respective inlets to an outlet trough for supplying clarified liquid from flow channels to the trough.

FIGS. 3 and 4 show that the clarified liquid 27C flows in the hollow supports 42 toward the respective outlet trough 36 and exits through a trough inlet 53 into the outlet trough 36. The hollow supports 42 are connected to the respective trough inlets 53 of the outlet troughs 36 for supplying clarified liquid 27C from the hollow supports 42 to the outlet troughs 36. In FIG. 4 a weir 54 is shown provided at the top of each side 56 of the outlet troughs 36 and may be adjusted higher or lower relative to the side 56 to allow the level 48 of the clarified liquid 27C to be set according to the particular embodiment 48-1, or 48-2, or 48-3 of the level 48 that is desired (see respective FIGS. 5A, 5B, and 5C).

Figure 5A:
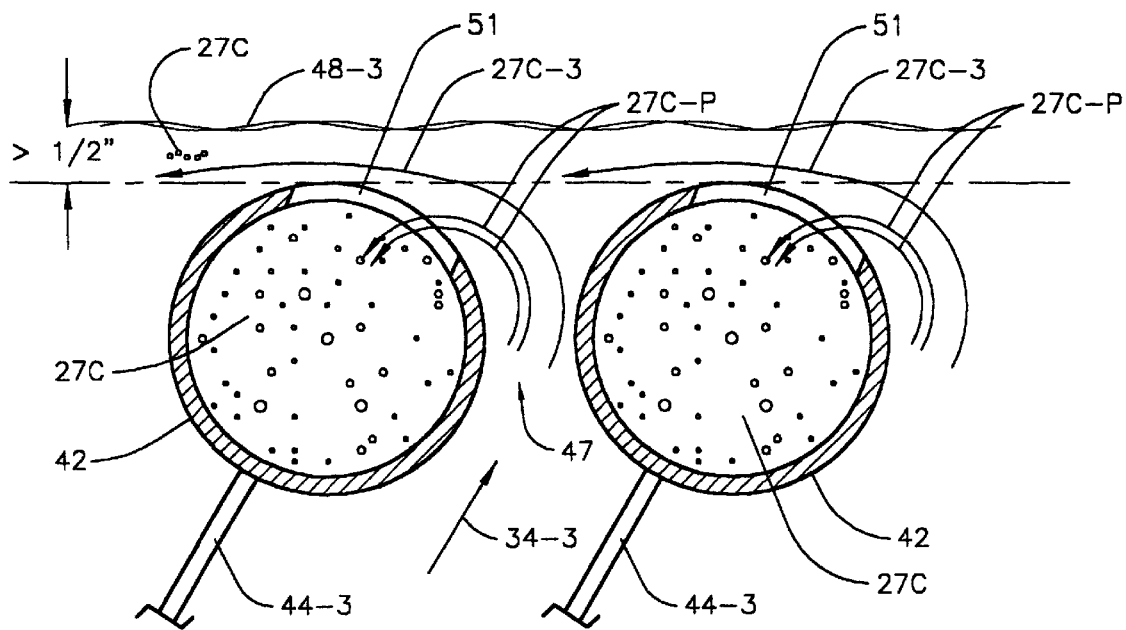
FIGS. 5A, 5B, and 5C are schematic elevational views respectively show a preferable, and more preferable, and a most preferable embodiment of the present invention in which the level of the clarified liquid is most preferably below the tops of the hollow supports, in which the level of the clarified liquid is more preferably about even with the tops of the hollow supports, and in which the level of the clarified liquid is preferably substantially above the top of the hollow supports.

As examples in addition to the most preferable level embodiment 48-1 described above, the preferable embodiment of the level 48-3 is shown in FIGS. 4 and 5A, in which the level 48-3 of the clarified liquid 27C is preferably substantially above the top 49 of the respective hollow support 42. The phrase "substantially above" indicates that such level 48-3 is from about two inches to about six inches above the top 49 of the respective hollow support 42. With the level 48-3 in that range, the clarified liquid 27C preferably is not only between the hollow supports 42 and between the adjacent plates 44. In particular, the clarified liquid 27C is also shown flowing upwardly from one of the flow channels (or zones) 34-3 and over (see arrow 27C-3) the hollow supports 42 past the opening 51 into the outlet 47 of the next adjacent flow channel 34-3. Although the benefits of the first level embodiment described with respect to FIG. 5C are reduced, as indicated by the two arrows 27C-P, there is still a substantial amount of flow of the clarified liquid 27C into the hollow supports 42 through the openings 51. In this situation, the word "substantial" means that at least half of the clarified liquid 27C flowing upwardly in the flow channel 34-3 below the outlet 47 flows into the openings 51 in the hollow support 42 shown on the left in FIG. 5A. Preferably, the "substantial" amount of flow means that as much as two thirds of the clarified liquid 27C flowing upwardly in the flow channel 34-3 below the outlet 47 flows into the openings 51 in that hollow support 42. Accordingly, in the third level embodiment normally there is some commingling of clarified liquid 27C (see arrows 27C-3) from one flow channel 34-3 with clarified liquid 27C from another one of the flow channels 34-3. However, this amount of commingling involves less than half of the clarified liquid 27C flowing upwardly in the flow channel 34-3 below the outlet 47 flows into the opening 51 in the hollow support 42. As a result, during normal settling operations, the flow of clarified liquid 27C in the hollow support 42 may be separately sampled for examination of the performance of the separate flow channel 34-3 that supplies the primary amounts 27C-P of clarified liquid 27C to that hollow support 42. Further, as described below, flow from the flow channel 34-3 may still be substantially blocked during servicing involving replacing a fouled support 42. Here, "substantially blocked" means that only the flow 27C-3 that would normally have entered the next support 42 to the left in FIG. 5A, for example, will not be blocked upon removal of the right hand support 42 shown in FIG. 5A.

Figure 6:
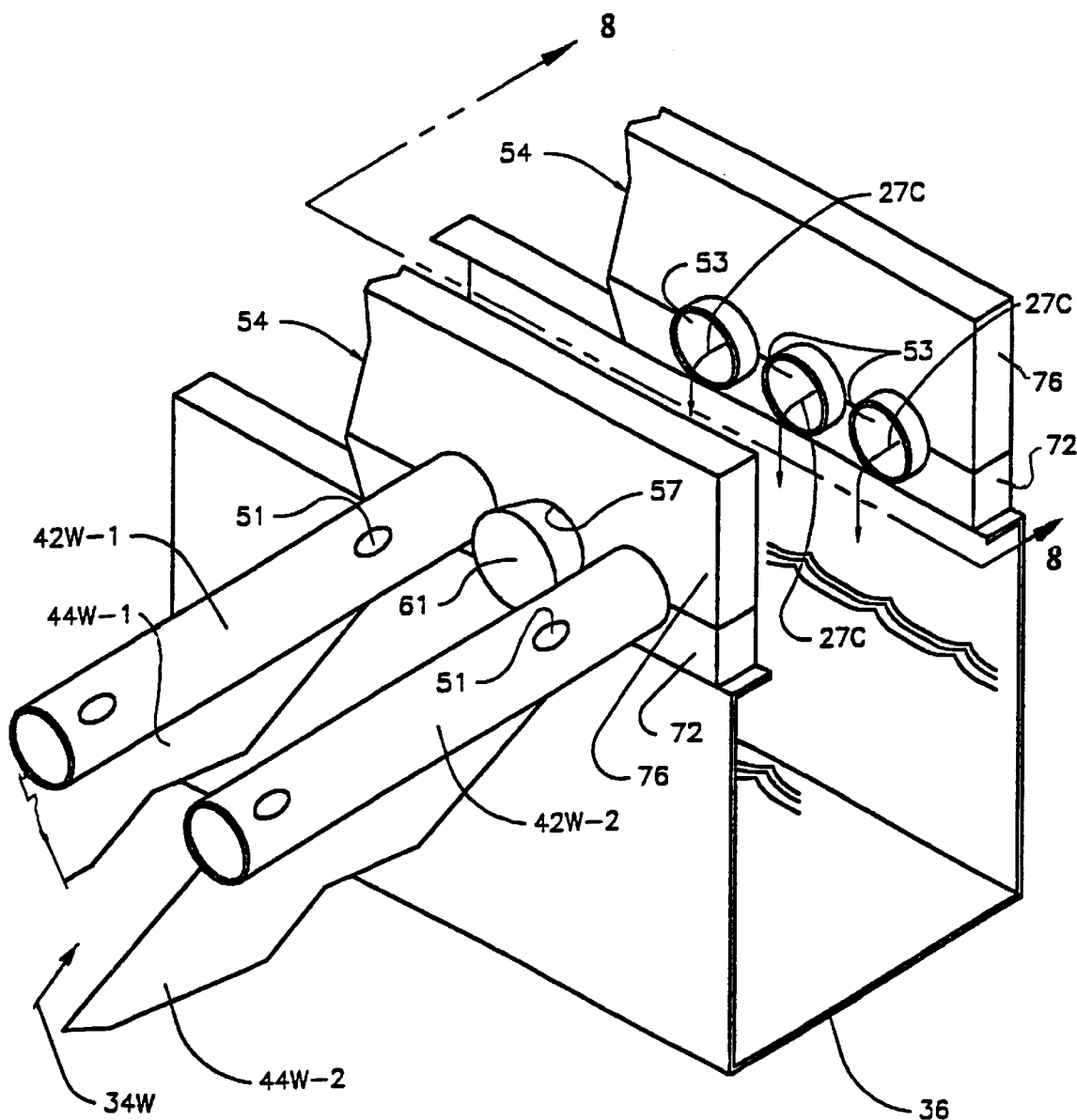
FIG. 6 is a perspective view of a portion of FIG. 1 enlarged to show the inlets of the hollow supports, with the supports in the form of pipes.

As indicated above, if it is found by such sampling that too many solids 26 are present in the clarified liquid 27C from that flow channel 34-3, then one or both of the plates 44 ("fouled plates") (and the corresponding hollow supports 42) that define that flow channel 34 may be removed and replaced. Further, as shown with respect to FIG. 6, the servicing operations of removal and replacement of the one or both such fouled plates 44 may be performed without interrupting or substantially impairing the normal settling operations of the other flow channels 34. FIG. 6 shows that one hollow support 42 and one corresponding fouled plate 44 have been removed to define a now-wider flow channel 34W between remaining plates 44W-1 and 44W-2. As described above, there is the tendency for the same flow rate of liquid 27 and solids 26 to occur in the now-wider flow channel 34W between the two remaining adjacent plates 44W-1 and 44W-2. However, such flow through and out of that now-wider flow channel 34W into the outlet troughs 36 may be blocked. FIG. 6 shows that during one aspect of the servicing operation the blocking is achieved by placing a plug 61 in each of the trough inlets 57 corresponding to where the now-removed hollow supports 42 were.

With such flow to the outlet trough 36 from the now-wider flow channel 34W blocked by the plugs 61, the only flow of the clarified liquid 27C from the now-wider flow channel 34W would be over the top 49 of the respective hollow support 42, and whether that flow occurs depends on the current embodiment of the level 48 (and thus on the setting of the weirs 54). For example, in embodiment 48-1 (FIG. 5C) there would be no flow of the clarified liquid 27C from the now-wider flow channel 34W over the top 49 of the respective hollow support 42. As another example, in embodiment 48-3 there would be the flow 27C-3 of the clarified liquid 27C from the now-wider flow channel 34W over the top 49 of the respective hollow support 42. As a further example, in embodiment 48-2 shown in FIG. 5B, there would be the flow 27C-2 of the clarified liquid 27C from the now-wider flow channel 34W over the top 49 of the respective hollow support 42.

Any such flow 27C-2 or 27C-3 would be into a separate hollow support 42 associated with each of the remaining settler plates 44W-1 and 44W-2 (FIG. 6). That flow 27C-2 or 27C-3 into the separate hollow supports 44W-1 or 44W-2 is via the integral inlets 51 provided in each of those separate hollow supports 42W-1 or 42W-2. These integral inlets 51 permit receipt of the clarified liquid 27C-2 or 27C-3 flowing from the now-wider flow channel 34W. However, because these integral inlets 51 are designed to receive the flow only from the original adjacent narrower flow channels 34, the flow from the now-wider flow channel 34W is restricted, such that the flow into and in the now-wider flow channel 34W is reduced. As described above, with the reduced flow rate in the now-wider flow channel 34W there is an increase of the residency time of the liquid 27 and the solids 26 in the now-wider flow channel 34W. For example, if the now-wider flow channel 34W is twice as wide and the flow rate is half as much, there will be a return to the original settling rate of the former narrow flow channel 34. As a result, there is an increase in the likelihood of being able to continue normal settling operation of the clarifier 25 during the removal of the fouled settler plate 44.

Figure 7:
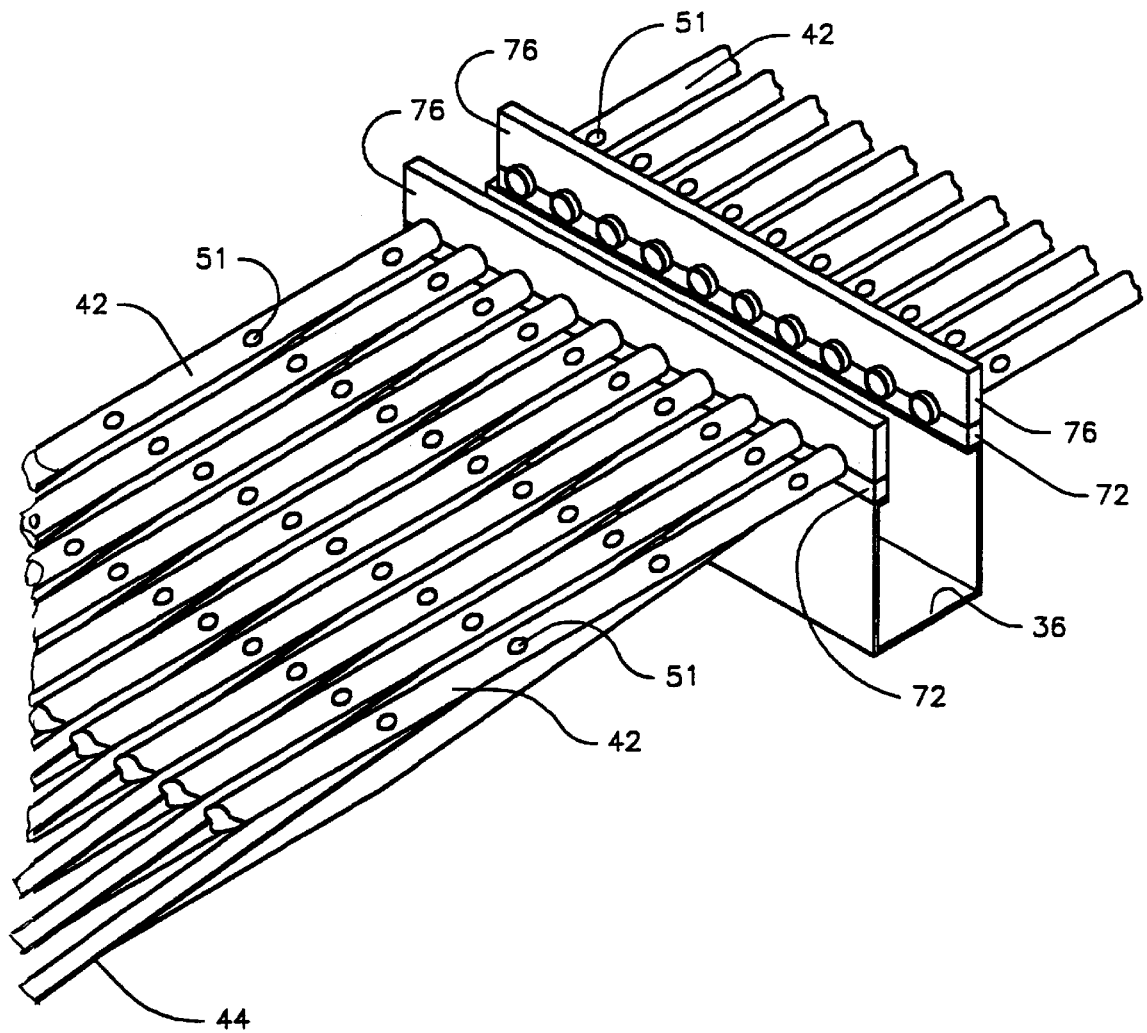
FIG. 7 is a view showing the hollow supports connected to a bottom plate and to a cover plate of the trough for removably mounting the pipes on the trough.
Figure 8:
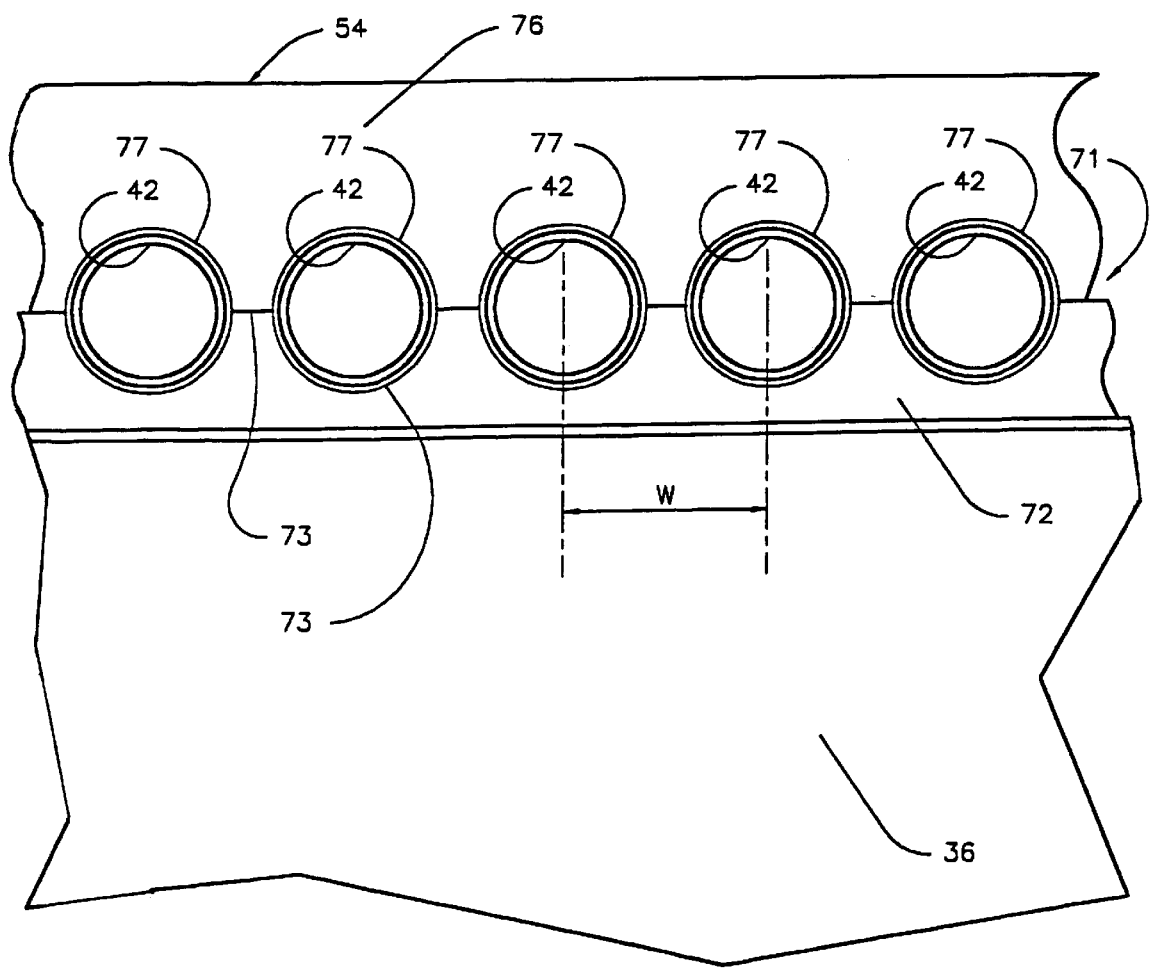
FIG. 8 is a view taken along line 8—8 in FIG. 6 showing more details of the hollow supports connected to a bottom plate and to a cover plate of the trough for removably mounting the pipes on the trough.

To facilitate the above-described removal of a fouled plate 44 and the corresponding hollow support 42, FIGS. 7 and 8 depict an embodiment of the trough 36 in which the respective hollow supports 42 are removable from the trough 36. The upper end of the trough 36, which may be the weir 54 for example, is formed in two pieces 71. A lower support plate 72 of the pieces 71 is mounted on the trough 54. The upper surface 73 of the lower plate 72 is scallop-shaped to define a series of depressions 74. Each depression 74 is adapted to receive one of the hollow supports 42 and to space such hollow support 42 from an adjacent hollow support 42 according to the desired width W of the flow channels 34. As described below, for the various embodiments of the hollow supports 42 the scallop shape is adapted to conform to the shape of the external surface of the particular hollow support 42. An upper mounting plate 76 is placed over the hollow supports 42 and fastened to secure the hollow supports 42 to the lower plate 72. The lower surface of the upper plate 76 is also scallop-shaped to define a series of depressions 77 corresponding to the depressions 74. Each depression 77 is also adapted to receive the top 49 of one of the hollow supports 42 and to work with the lower plate 72 to space such hollow support 42 from an adjacent hollow support 42 according to the desired width W of the flow channels 34.

To permit removal of any one of the hollow supports 42 that is held on the trough 36 by the plates 72 and 76, the upper plate 76 is removed from the lower plate 72. The desired hollow support 42 is then removed from the appropriate depression 74, exposing the trough inlets 53 formerly connected to the now-removed hollow support 42. Once the desired hollow support 42 is removed, the plugs 61 are inserted into the now-exposed trough inlets 53 to block those inlets 53.

Embodiments of Hollow Supports 42

Figure 9A:
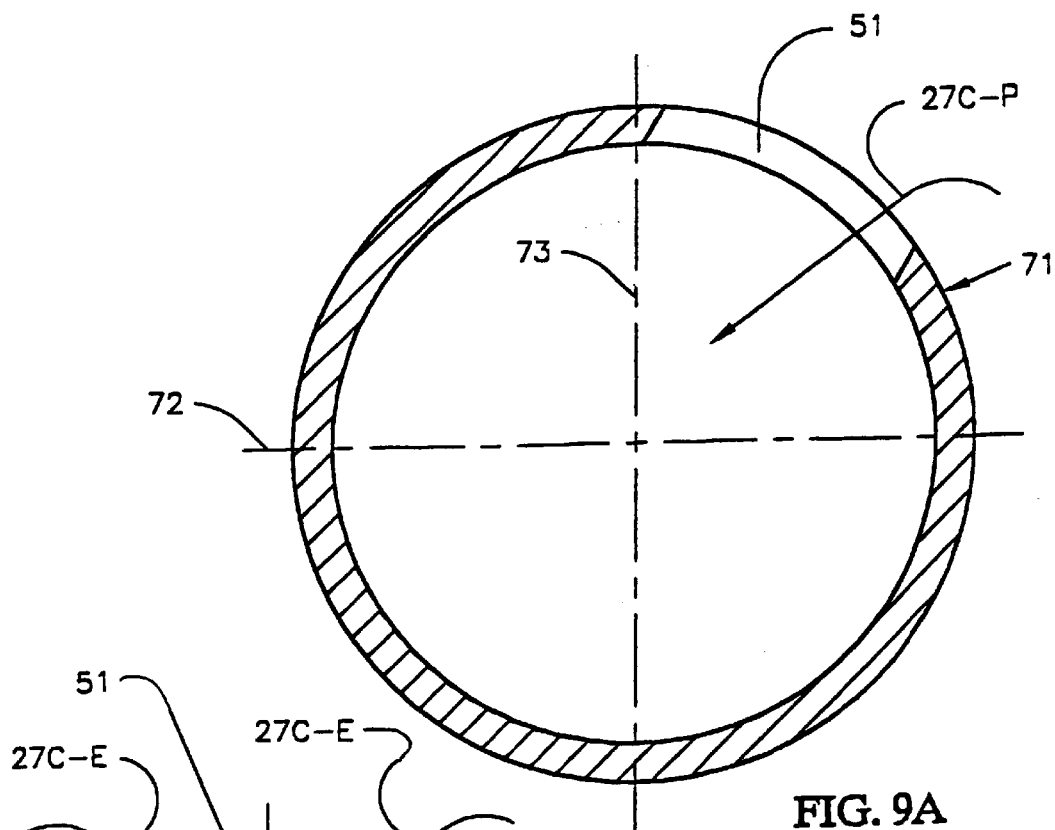
FIGS. 9A and 9B are cross sectional views of two embodiments of the pipes that form the hollow supports.
Figure 9B:
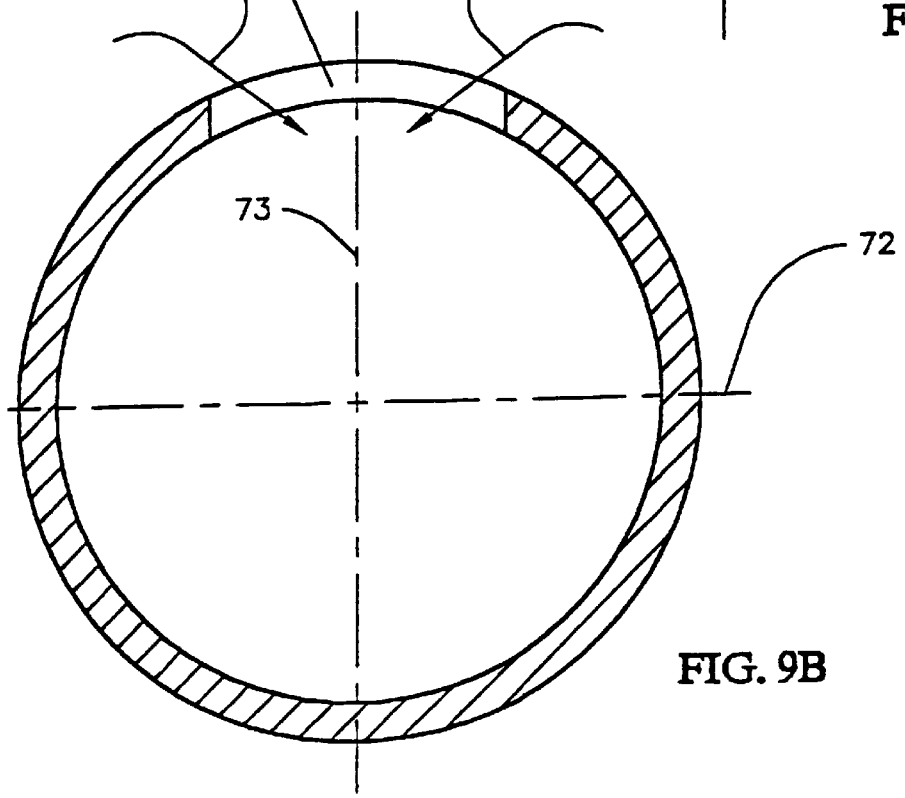

In FIGS. 1 through 8 the hollow supports 42 are shown as pipes or tubes (here referred to as 42P) that are by definition hollow so as to contain the flowing clarified liquid 27C. Such pipes or tubes 42P also have structural properties that enable them to span opposite outlet troughs 36 and carry the respective settler plates 44 without sagging. Such pipes or tubes 42P comprise one embodiment of the hollow supports 42. FIGS. 9A and 9B show two ways of providing the openings 51 the tubes 42P to admit the clarified liquid 27C. FIG. 9A shows the opening 51 provided in an upper half 71 of the pipe 42P as defined by axes 72 and 73. The opening 51 thus faces toward the right, which is toward all of the primary flows 27C-P shown in FIGS. 5A–5C. This opening is referred to as 51P to designate the primary flow. This facing of the opening 51P fosters these primary flows 27C-P and the desired flow of clarified liquid 27C from one flow channel 34 primarily, if not exclusively, into the adjacent pipe 42.

FIG. 9B also shows the opening 51 provided in the upper half 71 of the pipe 42P and designated 51C. The opening 51C is centered on the axis 73 to foster receipt of clarified liquid 27C from each flow channel 34 on the opposite sides of the one pipe 42P, for example. Such opening 51C is useful, for example, in the third embodiment of the level 48 shown in FIG. 5A in that the level 48-3 is above the tops 49 of the pipes 42P and relatively equal flow (see arrows 27C-E in FIG. 9B) from both such sides of the one pipe 42P into the opening 51 C may be desired.

Figure 10A:
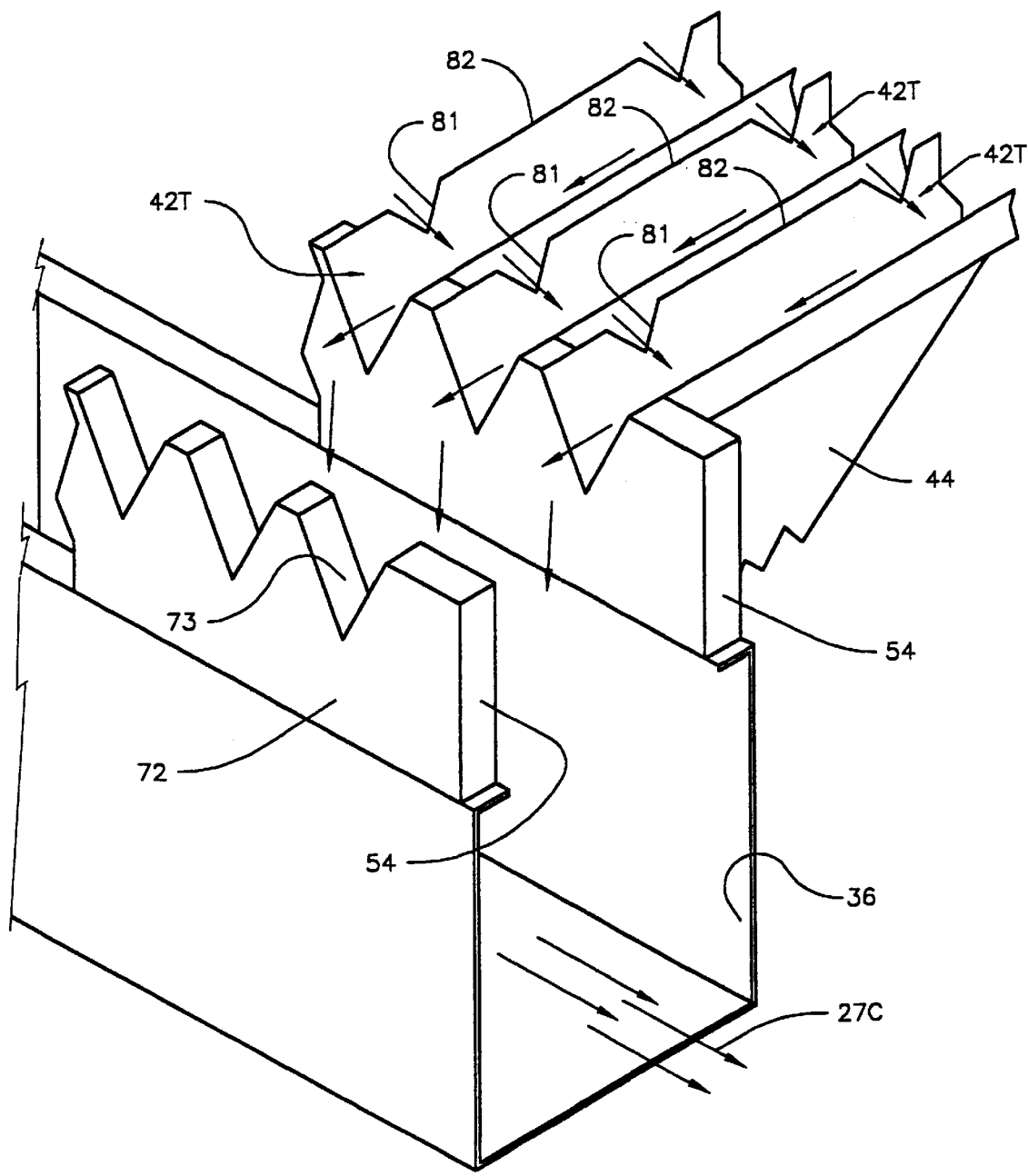
FIGS. 10A, 10B, and 10C shows another embodiment of the hollow supports as a trough having either a generally V shape (FIGS. 10A and 10B) or a generally U-shape (FIG. 10C).
Figure 10B:
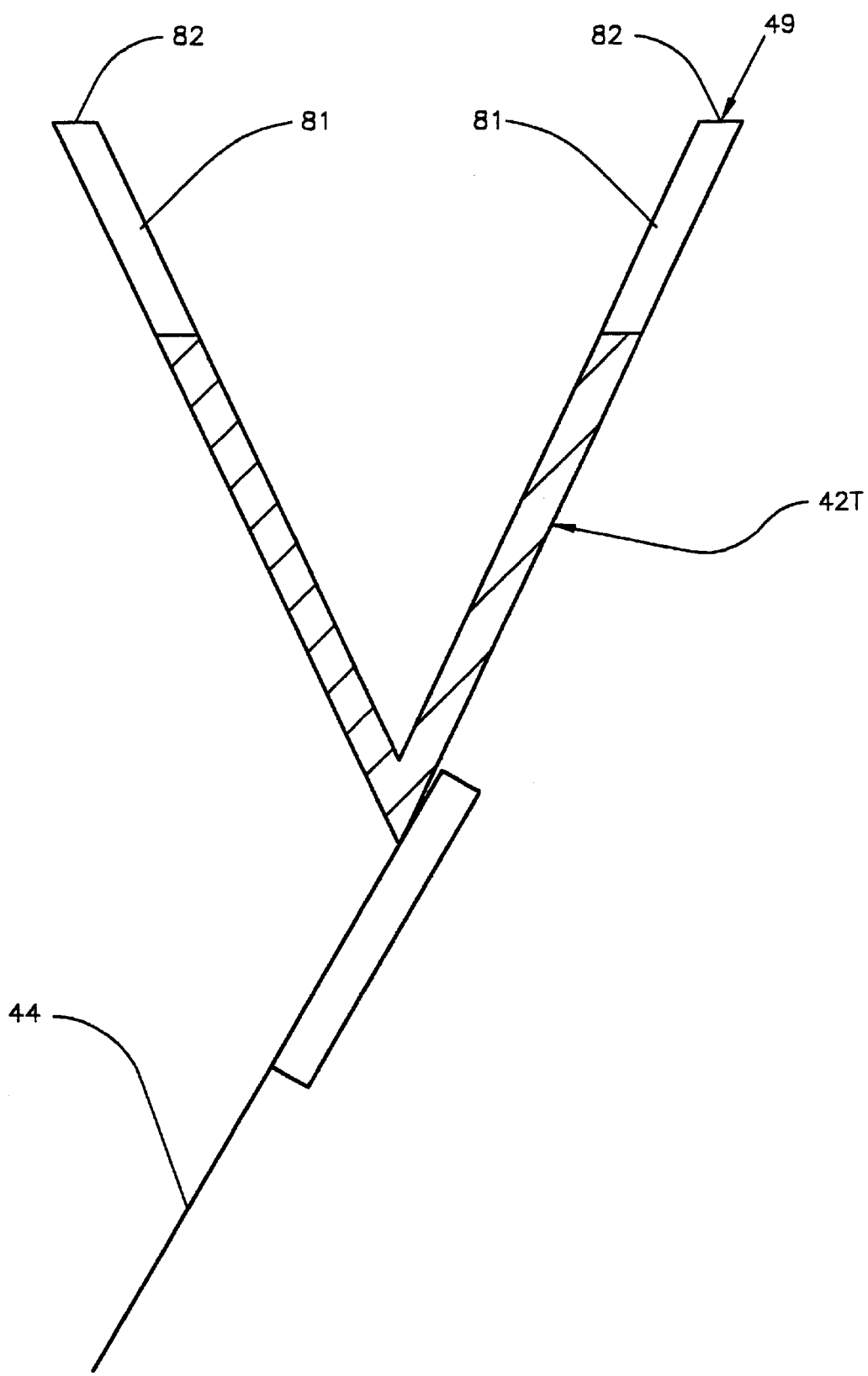

FIGS. 10A and 10B show a second embodiment of the hollow supports 42, which are in the form of support and collection troughs referred to as 42T. The troughs 42T have a V-shaped cross section and have structural properties that enable them to span opposite outlet troughs 36 and carry the respective settler plates 44 without sagging. Also, inlet notches 81 may be provided in each opposite edge 82 to admit the clarified liquid 27C.

The troughs 42T are mounted on the outlet troughs 36 so that the height of the edges 82 is below that of the top of the weirs 54. With the clarified liquid 27c below the top of the weirs 54 the clarified liquid 27C flows into the notches 81. The upper end of the outlet troughs 36, which may be the weir 54 for example, may be formed in two pieces 71 in the manner described with respect to FIG. 8 (as shown in FIG. 10A). For efficiency of disclosure, in FIG. 10A only the lower support plate 72 of the pieces 71 is shown mounted on the outlet trough 54. The upper surface 73 of the lower plate 72 is scallop-shaped to define a series of depressions 74. Each depression 74 shown in FIG. 10A is V-shaped to receive one of the troughs 42T and to space such trough 42T from an adjacent trough 42T according to the desired width W of the flow channels 34. The scallop shape is adapted to conform to the shape of the lower external surface of the trough 42T, Not shown in FIG. 10A is an upper mounting plate 76 placed over the trough 42T and removably fastened to secure the trough 42T to the lower plate 72, which is done in the manner described with respect to FIG. 8. The lower surface of the upper plate 76 is also scallop-shaped to define a series of depressions 77 corresponding to the shape of the upper surface of the V-shaped trough 42T. Each depression 77 is also adapted to receive the top 49 of one of the trough 42T and to work with the lower plate 72 to space such trough 42T from an adjacent trough 42T according to the desired width W of the flow channels 34.

Figure 10C:
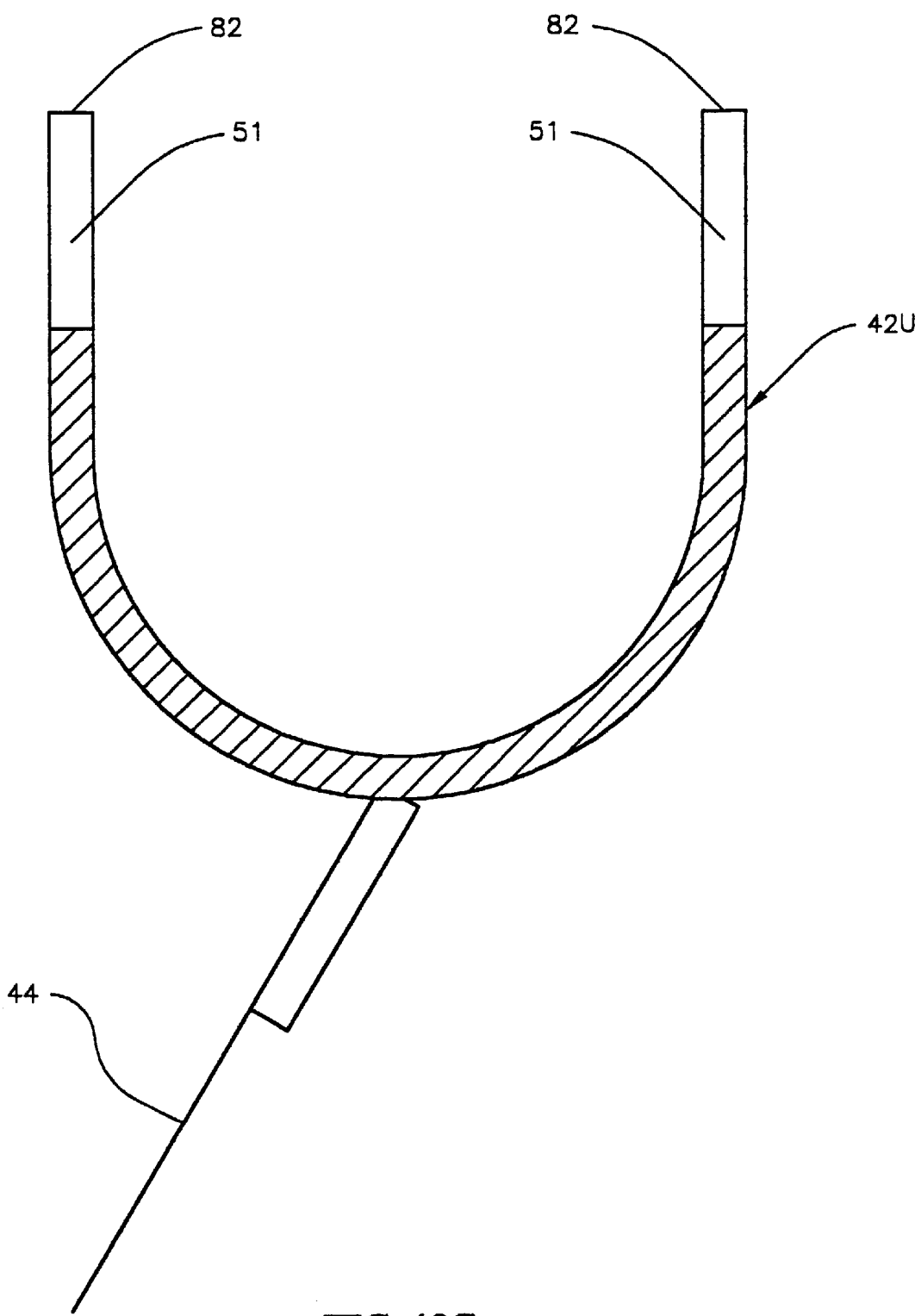

FIG. 10C shows a third embodiment of the hollow supports 42, which are in the form of support and collection troughs referred to as 42U. The troughs 42U have a U-shaped cross section and have structural properties that enable them to span opposite outlet troughs 36 and carry the respective settler plates 44 without sagging. Also, inlet notches 81 may be provided in each opposite edge 82 to admit the clarified liquid 27C. The troughs 42U may also be mounted on the outlet troughs 36 so that the height of the edges 82 is below that of the top of the weirs 54, and the two pieces 71 used to removably mount the troughs 42U on the outlet trough 36 as described above with respect to the troughs 42T, for example.

Clarification Methods

A first embodiment of the method of the present invention clarifies the liquid 27 by separating the suspended solids 26 from the liquid 27 1. The first embodiment may include operations of defining the separate channels 34 in the basin 29 for guiding the clarified liquid 27C. A given one of the separate channels 34 has the upper end 47 defined by the first and second spaced hollow supports 42. Another operation is providing at least one of the apertures 51 in at least one of the first and second hollow supports 42 that define the given one of the separate channels 34 to collect the clarified liquid 27C from the upper end of the given one of the separate channels 34.

A second embodiment of the method of the present invention also clarifies the liquid 27 by separating the suspended solids 26 from the liquid 27. The second embodiment may include an operation of providing the clarifier section 37 with first and second opposite sides 28, each of the sides 28 having an outlet trough 36 mounted thereon. Separate channels 34 are defined in the clarifier section 37 for guiding the clarified liquid 27C, with each separate channel 34 having the upper end 47. A pair of spaced hollow supports 42 are provided at the upper end 47 of each of the channels 34 and extending across the clarifier section 37 between the first and second opposite sides 28. A series of the openings 51 is provided in each of the hollow supports 42 to collect the clarified liquid 27C from the upper end 47 of each of the separate channels 34. The supports 42 guide the collected clarified liquid 27C to the outlet trough 36.

A third embodiment of the method of the present invention also clarifies the liquid 27 by separating the suspended solids 26 from the liquid 27. The third embodiment may include an operation of defining the clarifier section 37 in the basin 29, the section 37 having opposite sides 28 and the trough 36 at each opposite side 28. For each of two settler plates 44, an operation provides the hollow support 42 extending between the troughs 36. The providing of the supports 42 is effective to support each respective plate 44 with an upper end 47 of the respective plate 44 positioned above a lower end of the respective plate. Liquid 27 and the solids are directed between the two supported settler plates 44 from the lower end to the upper end 47 to settle the solids 26 from the liquid 27 and provide clarified liquid 27C to the upper ends 47 of the two settler plates 44. In a next operation there is collecting the clarified liquid 27C in at least one of the hollow supports 44.

A fourth embodiment of the method of the present invention also clarifies the liquid 27 by separating the suspended solids 26 from the liquid 27. The fourth embodiment may include an operation of flowing the clarified liquid 27C in a plurality of the separate upwardly extending flow paths 34. Each flow path 34 has the upper end 47. Another operation is separately collecting the clarified liquid 27C from each of the plurality of separate upwardly extending flow paths 34, as shown in level embodiment 48-1 (FIG. 5C), for example.

A fifth embodiment of the method of the present invention also clarifies the liquid 27 by separating the suspended solids 26 from the liquid 27, and may include suboperations of the operations of the fourth method described above. The fifth embodiment may include suboperations of the fourth embodiment operations of separately collecting and directing. The suboperations are include defining a separate conduit (e.g., the support 42) at the upper end 47 of each of the respective separate flow paths 34. Each of the separate conduits 42 receives clarified liquid 27C from a separate flow path 34 and supplies the clarified liquid 27C to the outlet trough 36 through a separate inlet 53. Further suboperations include determining that one of the separate conduits 42 is not performing the collecting operation properly (see description above of FIG. 6). A further suboperation includes removing the one conduit 42 from the upper end 47 of the respective separate flow path 34 in conjunction with closing the separate inlet 53 to the trough 36 corresponding to the one removed conduit 42. The closing may be by inserting the plug 61 into the inlet 53. Then there is an operation of installing a new separate conduit 42 conduit at the upper end 47 of the respective separate flow path 34 and opening the separate inlet 53 to the trough 36 corresponding to the new separate conduit 42. The opening may be by removing the plug 61 from the inlet 53.

In the above methods, the operations of collecting clarified liquid 27C may be by providing the tubes or pipes 42P, or by providing the troughs 42T or 42U, for example. The troughs 42T have the opening 51 provided by the open top of the trough 51 T, which may have the notches 81, for example.

Figure 5B:
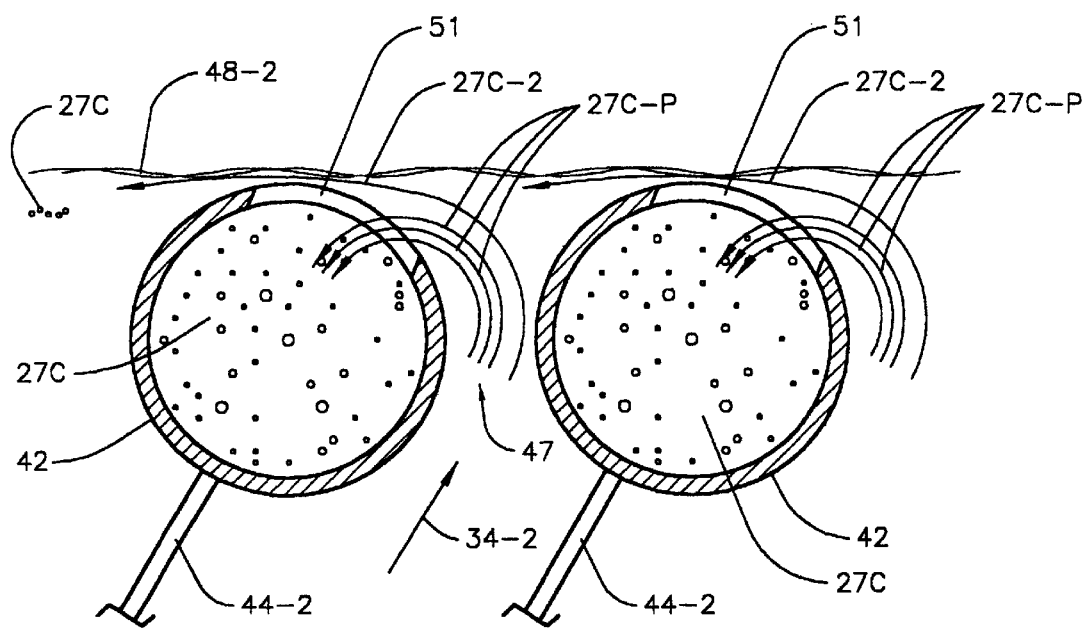
Figure 5C:
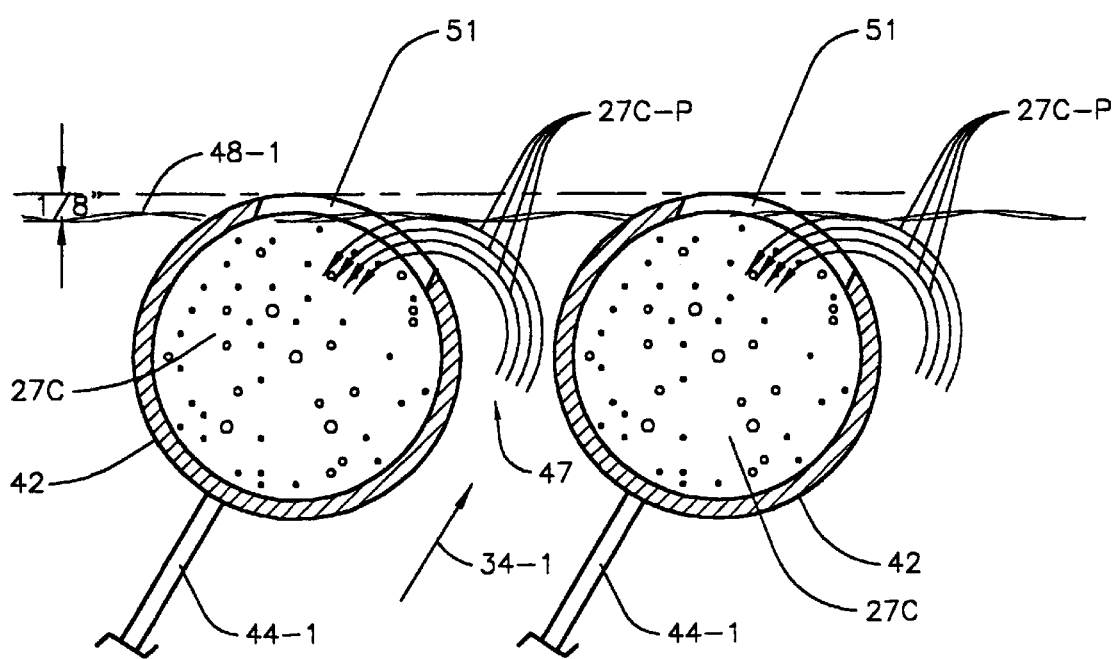

In a sixth embodiment of the method of the present invention there may be provided a primary path, such as one of the flow paths 27C-1 or 26C-2 or 27C-3, for a primary amount of the clarified liquid 27C to flow from the upper end 47 into and through the left, for example, pipe 42P shown in FIGS. 5A–5C.

It is to be understood that the scope of the present invention is to be defined by the appended claims and not limited by the foregoing description, which describes the presently preferred ways in which the present invention may be embodied. Numerous other embodiments may be devised and still come within the scope of the present invention.

What is claimed is:

1. A method of removing clarified liquid from a basin, comprising the operations of:
   defining separate channels in the basin for guiding the clarified liquid, a given one of the separate channels having an upper end defined by first and second spaced hollow members; and
   providing at least one aperture in at least one of the first and second hollow members that define the given one of the separate channels to collect the clarified liquid from the upper end of the given one of the separate channels.

2. A method according to claim 1, wherein the basin includes a clarifier section, further comprising:
   the defining operation comprising providing the hollow members extending across the clarifier section; and
   the providing operation providing a plurality of the apertures in the at least one hollow member to collect the clarified liquid from the upper end of the given one of the separate channels.

3. A method of removing clarified liquid from a clarifier section of a basin, comprising the operations of:
   providing the clarifier section with first and second opposite sides, each of the sides having a trough mounted thereon;
   defining separate channels in the clarifier section for guiding the clarified liquid, each separate channel having an upper end;
   providing a pair of spaced hollow members at the upper end of each of the channels and extending across the clarifier section between the first and second opposite sides; and
   providing a series of apertures in each of the hollow members to collect the clarified liquid from the upper end of each of the separate channels, and to guide the collected clarified liquid in the respective hollow members to the trough.

4. A method according to claim 3, further comprising:
   the operation of providing a pair of spaced hollow members including providing each hollow member with an upper half extending above first horizontal center line that bisects the hollow member; and
   the operation of providing a series of apertures including providing each of the apertures in the upper half of the respective hollow member.

5. A method according to claim 4, further comprising:
   the operation of providing the series of apertures including providing the apertures to one side of a second vertical center line that bisects the hollow member.

6. A method according to claim 4, further comprising:
   the operation of providing the series of apertures including providing each of the apertures centered on a second vertical center line that bisects the hollow member.

7. A method according to claim 4, further comprising:
   the operation of providing a pair of spaced hollow members including defining a lower portion of the upper half extending below a second horizontal center line that extends through the upper half; and
   the operation of providing the series of apertures including providing each of the apertures in the lower portion of the upper half of the hollow members to promote the flow of the clarified liquid from a given one of the separate channels primarily into the apertures in the lower portion of one of the spaced hollow members at the upper end of the given channel.

8. A method of clarifying liquid in a basin by settling solids from the liquid, comprising the steps of:
   defining a clarifier section in the basin, the section having opposite sides and a trough at each opposite side;
   for each of two settler plates, providing a hollow support extending between the troughs, the providing being effective to support each respective plate with an upper end of the respective plate positioned above a lower end of the respective plate;
   directing liquid between the two supported settler plates from the lower end to the upper end to settle the solids from the liquid and provide clarified liquid to the upper ends of the two settler plates; and
   collecting the clarified liquid in at least one of the hollow supports.

9. A method according to claim 8, further comprising:
   the operation of providing a hollow support providing a hollow tube having a longitudinal axis and apertures through the tube and spaced along the direction of the longitudinal axis.

10. A method according to claim 8, further comprising:
the operation of providing a hollow support providing a channel-shaped trough having a longitudinal axis and an open top extending in the direction of the longitudinal axis.

11. A method according to claim 10, wherein the trough has opposite upper edges along the open top, further comprising:
providing generally V-shaped notches in each of the upper edges and spaced in the direction of the longitudinal axis for allowing the clarified liquid to enter the trough along the direction of the longitudinal axis.

12. A method according to claim 8, wherein the collecting operation directs the clarified liquid out of the basin.

13. A method according to claim 8, wherein the collecting operation directs the clarified liquid to an outlet trough extending along one of the sides.

14. A method according to claim 8, further comprising:
performing the providing, directing and collecting operations with respect to a pair of additional settler plates; and
the operations with respect to the two settler plates and with respect to the pair of additional settler plates being effective to promote the collection of the clarified liquid flowing between the two plates separately from the clarified liquid flowing between the pair of plates.

15. A method of removing solids from liquid comprising the operations of:
providing a settling section of a basin having opposite sides and a bottom for containing the liquid with the solids, the liquid and the solids having a depth between the bottom and an upper surface of the liquid;
providing the settling section with first and second outlet troughs along respective ones of the opposite sides for directing clarified liquid from the basin;
providing a plurality of clarifier plates, each of the clarifier plates having a first dimension extending substantially completely between the opposite first and second outlet troughs and a second dimension extending from just above the bottom to just below the upper surface;
providing a plate support for each of the clarifier plates, each plate support extending between the first and second troughs in uniformly spaced relationship with respect to an adjacent plate support across the first dimension, each plate support being a hollow member having a lower portion and an upper portion;
securing one of the clarifier plates to the lower portion of a respective one of the plate supports so that a pair of adjacent supported clarifier plates define a separate channel extending from adjacent to the bottom to an upper end adjacent to the upper surface and substantially completely between the opposite first and second sides;
causing the liquid and the solids to flow upwardly in each of the channels to separate the solids from the liquid and provide clarified liquid flowing toward the upper end of each channel;
providing a first path for a primary amount of the clarified liquid to flow from the upper end of each particular channel into and through the upper portion of one of the two plate supports that support the two clarifier plates that define the particular channel; and
guiding the primary amount of the clarified liquid in the respective one plate support to the trough.

16. A method according to claim 15, further comprising:
providing a second path for a secondary amount of the clarified liquid to flow from the upper end of each particular channel into and through the upper portion of the other of the two plate supports that support the two clarifier plates that define the particular channel; and
guiding the secondary amount of the clarified liquid in the respective other plate support to the trough.

17. Apparatus for clarifying liquid in which solids are suspended, comprising:
clarifier means for containing the liquid and the solids suspended therein, the clarifier means having at least one outlet trough for clarified liquid;
flow control means extending across the clarifier means, the flow control means being formed from a plurality of separate flow control members, each of the flow control members having a width equal to the width of the clarifier means and a side adjacent to the at least one trough; and
means for mounting said plurality of flow control members in spaced relationship to each other for defining separate clarifier channels in which the liquid flows to settle the solids and provide clarified liquid, each of the separate clarifier channels having an inlet end for receiving liquid in which the solids are suspended and an outlet end for discharging the clarified liquid, one of the mounting means being provided for each flow control member at the outlet end, a given one of the mounting means for a particular flow control member being between a first and a second one of the flow control members adjacent to the given one of the mounting means, the particular flow control member and the first and the second flow control members defining respective first and second flow channels, the given one of the means for mounting the particular flow control member being hollow and shaped for receiving the clarified liquid from the respective first and second flow channels.

18. Apparatus according to claim 17, wherein the given one of the hollow means for mounting the particular flow control member is shaped to define an inlet centered between the respective first and second flow channels.

19. Apparatus according to claim 17, wherein the given one of the hollow means for mounting the particular flow control member is shaped to define an inlet between the respective first and second flow channels and closer to the first flow channel than to the second flow channel to promote flow of the clarified liquid primarily from the first flow channel into the given one of the hollow means.

20. Apparatus according to claim 17, further comprising:
the clarifier means having opposite sides and the at least one outlet trough being one outlet trough adjacent to each of the opposite sides; and
each one of the mounting means being tublular and extending across the clarifier section along the respective flow control member for guiding the flow of the clarified liquid from the respective first and second flow channels to each one of the outlet troughs.

21. Apparatus for removing clarified liquid from a clarifier section in a basin, comprising:
the clarifier section having first and second opposite sides;
a liquid outlet trough extending along at least one of the sides;
a first pair of hollow supports extending between the at least one of the liquid outlet troughs and either a second one of the at least one outlet trough or one of the sides;

a first set of settler plates, each plate of the first set being connected to one support of the first pair of hollow supports;

connectors mounting the hollow supports along the respective outlet troughs or opposite sides in spaced relationship to each other to position the settler plates in spaced relationship and define a first settler flow channel having a bottom end and a top end, the solids settling to the bottom end and clarified liquid flowing to the top end of the first channel; and the hollow supports of the first pair of supports having at least one opening for receiving the clarified liquid flowing from the top end of the first channel.

22. Apparatus according to claim 21, further comprising:

a second pair of hollow supports extending between the at least one of the liquid outlet troughs and either a second one of the at least one outlet trough or one of the sides;

a second set of settler plates, each plate of the second set being connected to one support of the second pair of hollow supports;

connectors mounting the hollow supports of the second pair of hollow supports along the respective outlet troughs or opposite sides in spaced relationship to each other to position the settler plates of the second set of settler plates in spaced relationship and define a second settler flow channel having a bottom end and a top end, the solids settling to the bottom end and clarified liquid flowing to the top end of the second channel; and the hollow supports of the second pair of supports having at least one opening for receiving the clarified liquid flowing from the top end of the second channel.

23. Apparatus according to claim 22 wherein the hollow supports of the respective first and second pair of supports are provided with the openings positioned so that a substantial amount of the flow of the clarified liquid from the top end of the first channel flows into the hollow supports of the first pair of supports and the clarified liquid from the top end of the second channel flows into the hollow supports of the second pair of supports to maintain the clarified liquid flowing in the first channel substantially separate from the clairfied liquid flowing in the second channel.

24. Apparatus according to claim 22, further comprising:

the first pair of hollow supports being connected to the at least one liquid outlet trough to discharge the clarified liquid into the at least one outlet trough; and the second pair of hollow supports being connected to the at least one liquid outlet trough to discharge the clarified liquid into the at least one outlet trough.

25. Apparatus according to claim 24, wherein:

the respective connections between the first and second hollow supports are removable;

the connections between the respective first and second hollow supports and the at least one liquid outlet trough are defined by a respective first and second inlet to the the at least one outlet trough; and a closure is provided for the respective first and second inlets, the closures being insertable into either of the first or second liquid inlets upon separation of the connection between the respective hollow support and the respective at least one outlet trough.

26. A method of servicing a clarifier section of a basin, wherein the clarifier section has first and second opposite sides, a liquid outlet trough extending along at least one of the sides, a first pair of hollow supports extending between the at least one of the liquid outlet troughs and either a second one of the at least one outlet trough or one of the sides, a first set of settler plates, each plate of the first set being connected to one tubular support of the first pair of hollow supports, removable connectors mounting the hollow supports along the respective outlet troughs or opposite sides in spaced relationship to each other to position the settler plates in spaced relationship and define a first settler flow channel having a bottom end and a top end, and wherein the hollow supports of the first pair of supports have at least one opening for receiving the clarified liquid flowing from the top end of the first channel and directing the clarified liquid through an inlet into the at least one trough; the method comprising the operations of:

removing the connector that mounts one of the hollow supports along the respective outlet troughs or opposite sides;

removing the one support from the clarifier section for servicing;

closing the inlet corresponding to the one hollow support;

installing another hollow support to replace the one hollow support;

when the other hollow support is installed in position to direct the clarified liquid through the closed inlet, opening the closed inlet; and reinstalling the connector to mount the other hollow support along the respective outlet troughs or opposite sides.

27. A method according to claim 26, further comprising:

providing the at least one trough in the form of a serpentine-shaped bottom plate adapted to extend under the hollow supports;

providing the connector in the form of a serpentine-shaped cover plate adapted to removably extend over the hollow supports at the at least one trough and to cooperate with the opposed bottom plate of the at least one trough to define the inlets;

the operation of removing the connector that mounts one of the hollow supports along the respective outlet trough being performed by removing the cover plate from over the hollow supports; and the operation of closing the inlet corresponding to the one hollow support being performed by replacing the cover plate on the bottom plate and closing the inlet corresponding to the one removed hollow support.

28. A method of removing clarified liquid from a basin, comprising the operations of:

flowing the clarified liquid in a plurality of separate upwardly extending flow paths, each flow path having an upper end;

separately collecting the clarified liquid from each of the plurality of separate upwardly extending flow paths; and directing the separately collected clarified liquid to a trough for flow out of the basin;

the operations of separately collecting and directing comprising:

defining a separate conduit at the upper end of each of the respective separate flow paths, each of the separate conduits receiving clarified liquid from a separate flow path and supplying the clarified liquid to the trough through a separate inlet;

determining that one of the separate conduits is not performing the collecting operation properly;

closing the separate inlet to the trough corresponding to the one conduit;

removing the one conduit from the upper end of the respective separate flow path;

installing a new separate conduit conduit at the upper end of the respective separate flow path; and opening the separate inlet to the trough corresponding to the new separate conduit.

29. A method of removing clarified liquid from a settler section of a basin, comprising the operations of:

providing the settler section with opposite sides, a liquid outlet trough being mounted on at least one of the sides;

providing separate settler flow paths in the settler section, each of the settler flow paths extending substantially completely across the settler section between the opposite sides and discharging clarified liquid from a top of the respective settler flow path, the operation of providing the separate settler flow paths comprising providing a pair of settler plates corresponding to a separate settler flow path, and from each of the separate settler flow paths, separately collecting the discharged clarified liquid and separately guiding the collected clarified liquid to the liquid outlet trough mounted on the at least one of the sides, the operation of separately collecting comprising providing one conduit to support each of the settler plates so that adjacent ones of the settler plates combine to define one of the flow paths, each of the conduits extending across the settler section and having at least one opening therein for receiving the clarified liquid from the flow path defined between the adjacent settler plates.

30. A method according to claim 29, wherein:

the operation of collecting comprising providing the conduit in the form of a hollow tube having a longitudinal axis and providing the at least one opening in the form of a plurality of apertures extending through the conduit and spaced along the conduit in the direction of the longiudinal axis.

31. A method according to claim 29, wherein:

the operation of collecting comprising providing the conduit in the form of a collection trough having a longitudinal axis and providing the at least one opening in the form of an elongated open top defined by opposite edges extending along the conduit in the direction of the longitudinal axis.

32. A method according to claim 31, wherein:

the operation of collecting comprising providing the edges at a given height and providing at least one of the edges with a series of notches, the series extending along the trough in the direction of the longitudinal axis; and the operation of providing the settler section with a liquid outlet trough including providing a weir on the outlet trough, the weir having a height exceeding the given height of the edges of the collection trough to direct the clarified liquid into the notches.

* * * * *